United States Patent Office 3,347,815
Patented Oct. 17, 1967

3,347,815
MAGNETIC INK
Oliver A. Short and Jerome R. White, Wilmington, Del., assignors to E. I. du Pont de Nemours and Company, Wilmington, Del., a corporation of Delaware
No Drawing. Filed Oct. 16, 1963, Ser. No. 316,542
4 Claims. (Cl. 260—33.4)

This application is a continuation-in-part of application Ser. No. 302,489, filed Aug. 8, 1963, by Oliver A. Short.

This invention relates to a magnetic ink, more particularly it relates to a heat generating magnetic ink which may act as a source of sudden high heat where, as a printed pattern, it is subjected to a magnetic field.

Wax and wax-containing coatings have long been applied to paper and similar structures to permit the heat-sealing of the structures to each other. The heat for such heat-sealing has usually been supplied by an electric heating element or other suitable heating means whereby the heat-seal is created by a contact of the hot surface to one or both sides of an overlapping structure to be sealed.

Recently it was found that the heating and heat-sealing of heat-sealable coatings can be greatly speeded up by application of finely divided magnetically actuatable material to the coatings and subjecting the finely divided substance to a magnetic field to quickly heat and melt the coatings whereby to heat-seal the structures containing such coatings.

It is an object of this invention to provide a new and improved heat generating magnetic ink.

It is another object to provide a magnetic ink that may be printed or painted at high speeds as an undercoating under a heat-sealable coating on paper or similar material and has the property of instantaneously heating to a given temperature to cause the coating to melt and heat-seal by subjecting the composite structure to a magnetic field.

A magnetic ink, in order to be practically useful for this purpose must have the following characteristics:

(1) It must be capable of printing at high speeds on rubber roll presses.
(2) It must be quick drying.
(3) It must adhere well to paper and the like.
(4) It must adhere well to wax and wax-containing heat-sealable coatings.
(5) It must stay fluid in the well of the printing press.
(6) It must contain magnetically activatable particles that will heat substantially instantaneously to a sufficiently elevated temperature to simultaneously melt the adjacent coating of heat-sealable material.

It has now been found, in accordance with this invention, that a magnetic ink having the following composition will have all of the attributes and characteristics above described.

The base of the ink should be a 20 to 40%, preferably 28 to 32% solution of polyvinyl acetate in a lower alcohol solvent, i.e., an alcohol having 1 to 4 carbon atoms, such as methyl, ethyl, the propyl and the butyl alcohols and mixtures of 2 or more of such alcohols. Polyvinyl acetates having a molecular weight of 5000 to 30,000 are suitable. Such poylvinyl acetates have excellent adhesiveness to both paper and wax-containing heat-sealable coatings. The lower alcohol solvents may be used with rubber printing rolls without deteriorating them and they have the character of drying at a desirable rate.

To each part by weight of the alcohol solution of polyvinyl acetate is added 1 to 3 parts of a finely divided calcined ferrite having a particle size of 0.5 to 5 microns and an over-all composition corresponding to from 3 to 30% NiO by weight, 2 to 20% ZnO by weight, 0 to 5% MnO by weight and the remainder $Fe_2O_3$, which must be at least 66% by weight. Although MnO is not an essential component, the preferred ferrites have an MnO content of 0.2 to 2% by weight.

Finely divided ferrite of the above composition has the property of heating to a temperature of 200° C. to 600° C. in about 100 milliseconds in a magnetic field of 200 oersteds or less and between 30 and 3000 megacycles. The ferrite particles, on removal or discontinuance of the magnetic field, return to normal temperature permitting the coating to congeal. The upper temperature is self-limiting, since the particles on reaching their specific Neel temperature, i.e. that temperature at which the magnetic hysteresis effects cease, will heat no further.

Although the above specifically described ferrite particles are preferred, ferrite particles in general are operative dependent upon the heating temperature desired, the particular Neel temperature of the ferrite and the available magnetic field.

The following example is given to illustrate a specific embodiment of the invention.

A commercial ferrite consisting essentially of about 10% NiO, 6% ZnO, 1% MnO and 83% $Fe_2O_3$ is ball-milled for 16 hours in water. The mill slip is filtered, dried and crushed to an average particle size of about 3 microns. The ferrite powder is then mixed with a 30% solution of polyvinyl acetate (molecular weight 5000 to 20,000) in a mixture of methyl and ethyl alcohols. The ferrite is used in the proportion of about 67% ferrite to 33% of the polyvinyl acetate solution and the mixture is adjusted to a viscosity of 500 to 1000 centipoise with ethyl alcohol.

The resulting magnetic ink may be printed by means of a rubber-rolled printing press on the areas to be sealed of a milk carton blank. The blank is then coated with a wax-containing heat-seal coating. At the milk filling plant the carton is formed and sealed by applying a magnetic field of 154 oersteds at 40 and 80 megacycles for about 100 milliseconds, and holding the sealed edges together until chilled.

The resulting carton is highly satisfactory as a commercial milk carton.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are as follows:

1. A heat generating magnetic ink that is printable on a rubber roll press and adheres well to paper and the like and also to wax-containing heat-sealable coatings, said ink consisting essentially of 1 part by weight of a 20% to 40% solution of polyvinyl acetate in a lower alcohol solvent and 1 to 3 parts by weight of a finely divided ferrite having a particle size of between 0.5 and 5 microns.

2. A heat generating magnetic ink that is printable on a rubber roll press and adheres well to paper and the like and also to wax-containing heat-sealable coatings, said ink consisting essentially of 1 part by weight of a 20% to 40% solution of polyvinyl acetate in a lower alcohol solvent and 1 to 3 parts of a finely divided calcined ferrite having a particle size of 0.5 to 5 microns and a composition of: 3 to 30% NiO by weight, 2 to 20% ZnO by weight, 0 to 5% MnO by weight and the remainder $Fe_2O_3$, which is at least 67% by weight.

3. A heat generating magnetic ink that is printable on a rubber roll press and adheres well to paper and the like and also to wax-containing heat-sealable coatings, said ink consisting essentially of 1 part by weight of a 20 to 40% solution of polyvinyl acetate in a lower alcohol solvent, said polyvinyl acetate having a molecular weight of 5,000 to 30,000, and 1 to 3 parts by weight of a finely divided calcined ferrite having a particle size of 0.5 to 5 microns and a composition of: 3 to 30% NiO by weight, 2 to 20% ZnO by weight, 0.2 to 2% MnO by weight and the remainder $Fe_2O_3$, which is at least 67% by weight.

4. The ink of claim 3 wherein the solvent is a mixture of methyl and ethyl alcohols.

References Cited

UNITED STATES PATENTS 2,087,480  7/1937  Pitman _____ 260—33.4
2,961,407  11/1960  Pickarski.

Skeist: Handbook of Adhesives, Reinhold Publishing Corp., 1962, pp. 349–350, 352–354, 357–360.

MORRIS LIEBMAN, *Primary Examiner.*

L. T. JACOBS, *Assistant Examiner.*